United States Patent
Otani

[11] Patent Number: 5,153,633
[45] Date of Patent: Oct. 6, 1992

[54] IMAGE STABILIZING DEVICE IN A CAMERA

[75] Inventor: Tadasu Otani, Yokohama, Japan

[73] Assignee: Canon Kabushiki Kaisha, Tokyo, Japan

[21] Appl. No.: 751,294

[22] Filed: Aug. 28, 1991

[30] Foreign Application Priority Data

Aug. 31, 1990 [JP] Japan ................................. 2-228267

[51] Int. Cl.⁵ .............................................. G03B 7/08
[52] U.S. Cl. ....................................... 354/430; 354/70
[58] Field of Search ................ 354/70, 430; 358/229

[56] References Cited

U.S. PATENT DOCUMENTS

| | | | |
|---|---|---|---|
| 4,731,669 | 3/1988 | Hayashi et al. | 358/229 |
| 4,901,096 | 2/1990 | Lemelson | 354/430 X |
| 5,084,724 | 1/1992 | Maeno | 354/430 |

Primary Examiner—Russell E. Adams
Assistant Examiner—Jae N. Noh
Attorney, Agent, or Firm—Robin, Blecker, Daley & Driscoll

[57] ABSTRACT

An image stabilizing device in a camera has image stabilizing means for preventing the image vibration of the camera, lock means for locking the image stabilizing means in a predetermined state, and control means responsive to the operation of a shutter release member to operate or release the lock means.

30 Claims, 9 Drawing Sheets

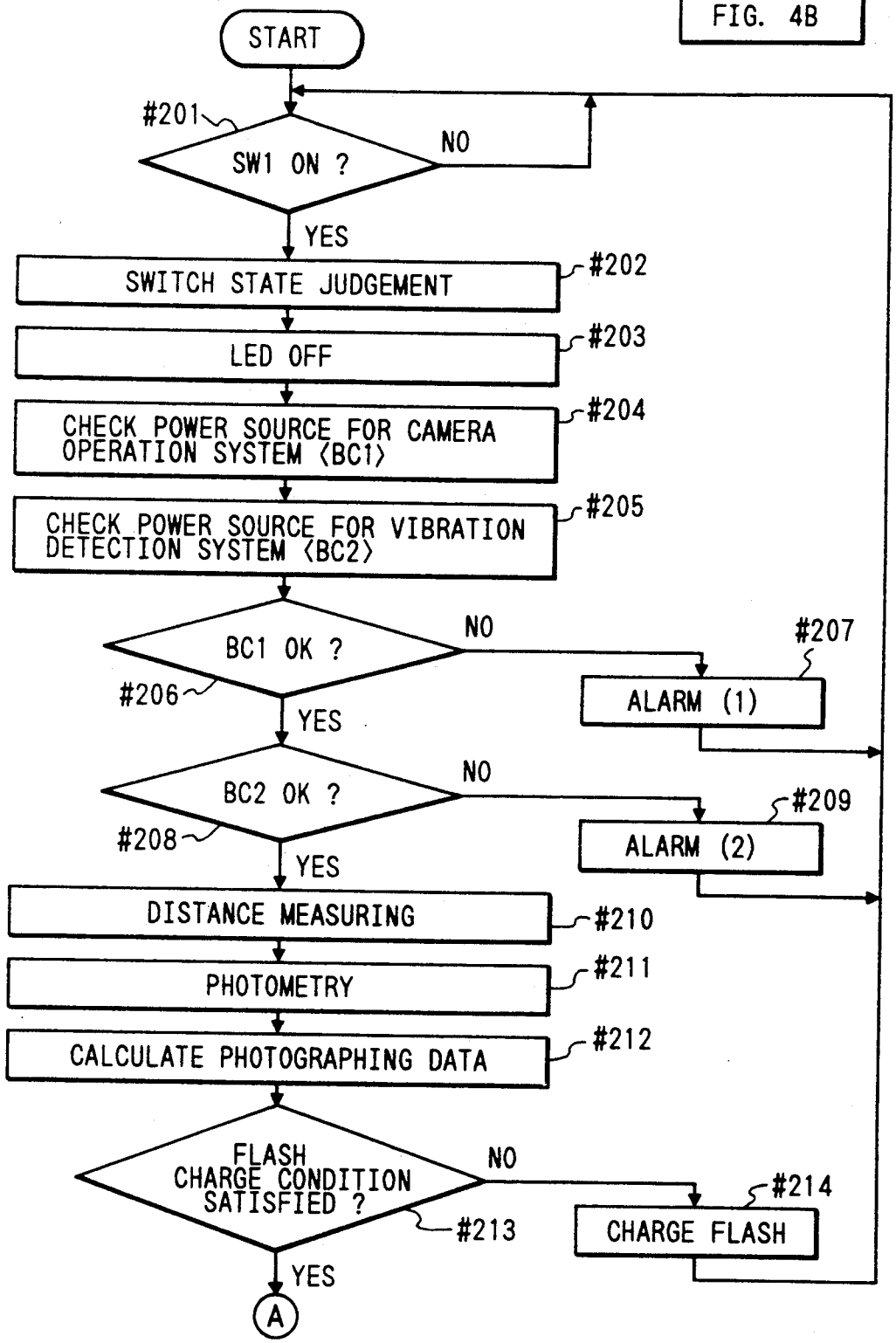

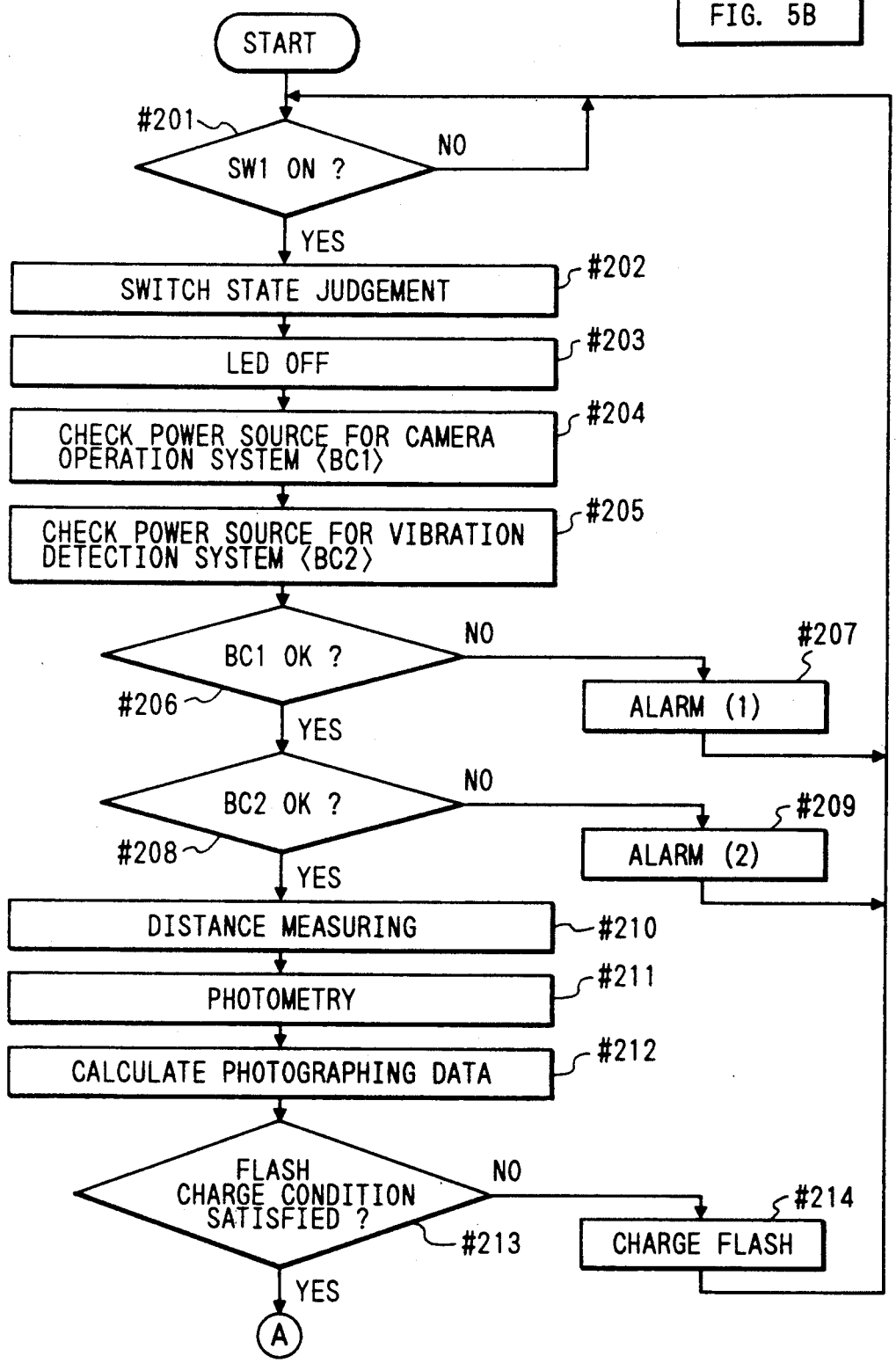

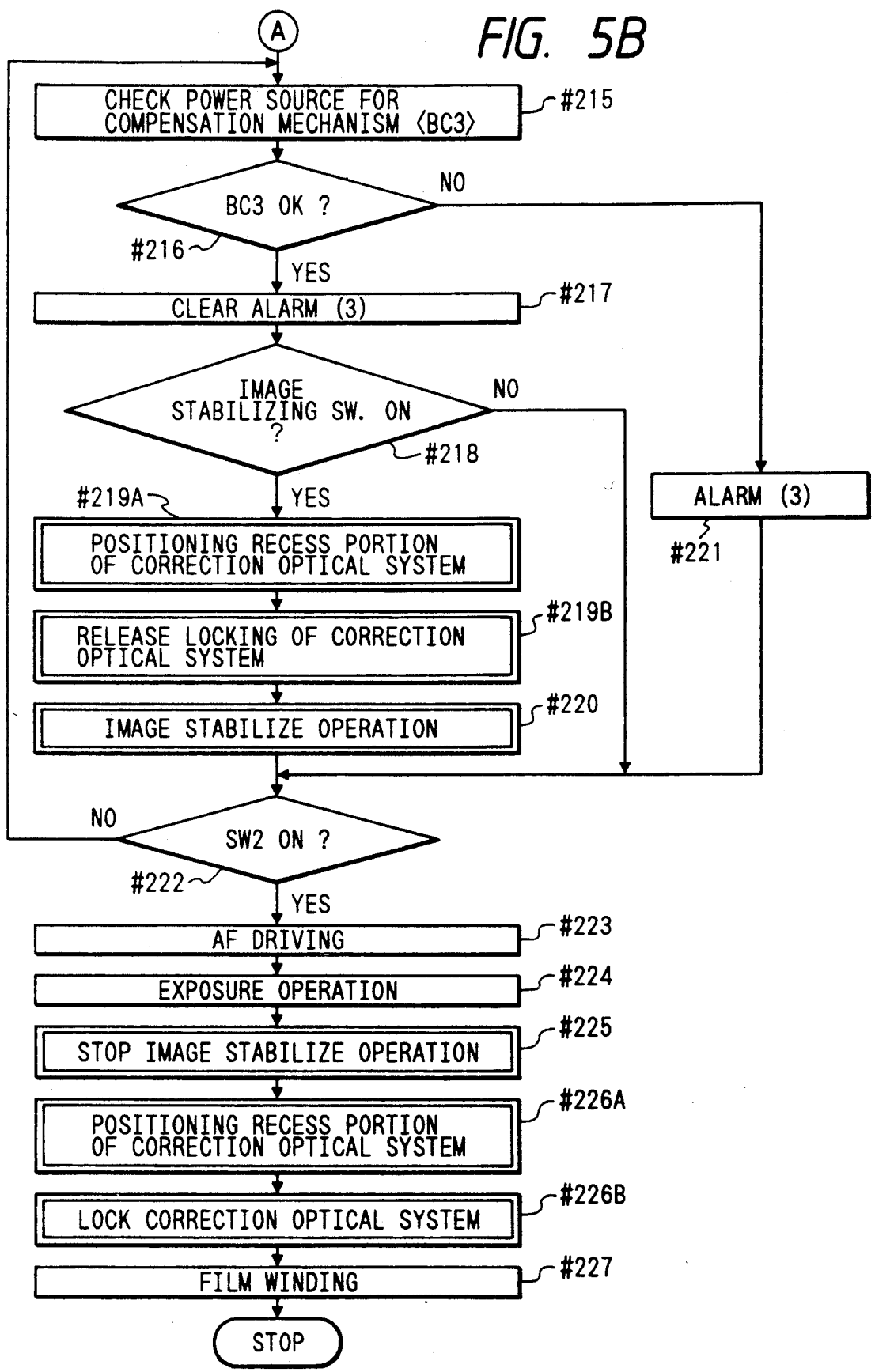

IMAGE STABILIZING DEVICE IN A CAMERA

BACKGROUND OF THE INVENTION

1. Field of the Invention

This invention relates to improvements in an image stabilizing device in a camera for preventing the image blur of the camera caused by hand vibration or the like.

2. Related Background Art

In modern cameras, important operations for photographing such as exposure determination and focusing are all automatized and therefore, even a person unskilled in camera operation very rarely fails in photographing, but it has been difficult to automatically prevent the failure in photographing caused by camera vibration.

So, in recent years, cameras have been researched which prevent even the failure in photographing attributable to camera vibration and particularly, development and studies haven been put forward about cameras directed to the purpose of preventing the failure in photographing caused by the photographer's hand vibration. The hand vibration of a camera during photographing, if taken as an example, is a vibration of a frequency usually of 1 HZ to 12 HZ, and an attempt has been made to detect such vibration of the camera and displace a correction lens in order to correct an image blur in conformity with the detected value, thereby enabling an object free of vibration to be confirmed in a viewfinder even if a vibration is caused to the camera, and enabling a photograph free of image blur to be taken.

Theoretically speaking, the detection of the vibration of a camera can be accomplished by carrying on the camera a vibration sensor for detecting angular acceleration, angular velocity or the like, and a camera vibration detecting system for electrically or mechanically integrating the output signal of said sensor and outputting angular displacement. On the basis of this detected information, a correction optical mechanism having as correction optical means a correction lens for making the photographing optical axis eccentric or inclined is driven to thereby effect the correction (suppression) of image vibration.

Here, the outline of a camera with the image vibration correcting function using an angular acceleration meter will be described with reference to FIG. 7 of the accompanying drawings. This example is one in which an image blur resulting from a vertical camera vibration 51p and a horizontal camera vibration 51y in the directions of arrows 51 is suppressed.

In FIG. 7, the reference numeral 52 designates a lens barrel, and the reference characters 53p and 53y denote angular acceleration meters for detecting the angular acceleration of the vertical camera vibration and the angular acceleration of the horizontal camera vibration, respectively. The angular acceleration detection directions of these meters are indicated by 54p and 54y, respectively. The reference characters 55p and 55y designate integrators each constructed by the use of a conventional analog integration circuit. These integrators integrate the signals of the respective angular acceleration meters and convert them into hand vibration angular displacement. The reference numeral 56 denotes a correction optical mechanism driven in a plane perpendicular to the optical axis in the directions 51p and 51y by said hand vibration angular displacement output (the reference characters 57p and 57y designate the driving portions thereof, and the reference characters 58p and 58y denote correction optical position detecting sensors), and the photographing optical axis is made eccentric by such movement of the correction optical mechanism, whereby there can be obtained the image vibration correcting effect in the image plane 59.

What has been described above refers to a case where image blur correction is being effected, but when image blur correction is not being effected, it is necessary to electrically or mechanically fix (lock) the correction optical mechanism 56. That is, considering the time when the camera is carried, if the correction optical mechanism 56 is not locked, a force which will restrain the movement in a plane perpendicular to the optical axis will hardly act on the correction optical mechanism 56 and therefore, the correction optical mechanism 56 will be inadvertently oscillated by the vibration of the camera when carried, and this will lead to inconveniences such as the creation of sound by the collision of the correction optical mechanism with the other surrounding members and the damage or functional destruction by the shock.

Heretofore, the locking of the correction optical mechanism 56 when image blur correction is not effected for a long time has rarely been electrically effected, that is, from the viewpoint of the saving of electric power, the correction optical mechanism has rarely been driven by an applied predetermined signal so as to assume a predetermined position, and the locking has chiefly been mechanically effected. With regard to this, Japanese Patent Publication No. 57-37852 proposes to mechanically lock and unlock a correction optical mechanism oscillated in a telescope or binoculars, and Japanese Laid-Open Patent Application No. 61-296862 proposes to mechanically lock and unlock a correction optical mechanism pivoted in a video camera.

However, both of these enable the correction optical mechanism to be locked and unlocked by operating an extraneous operating member for exclusive use. Generally, in a camera, the photographer's desire to obtain the image blur correcting effect, i.e., the necessity of an image blur corrected state with the correction optical mechanism unlocked, is within the range of a series of operations during the first stroke of a shutter release button as the photographing preparation operation in which the photographer looks into the viewfinder to confirm the object, and during the second stroke of the shutter release button as the photographing operation.

However, in the above-described examples of the prior art, the locking and unlocking of the correction optical mechanism are effected by the operation of the extraneous operating member for exclusive use therefor, and this has led to the disadvantage that the photographer is compelled to perform the cumbersome operations of locking and unlocking the correction optical mechanism discretely from the photographing preparation operation and the photographing operation.

Further, as already described, when the photographer forgets to lock the correction optical mechanism, the correction optical mechanism results in the inconvenience of being mechanically damaged by the shock of inadvertent vibration as when the camera is carried.

SUMMARY OF THE INVENTION

The present invention has been made in view of the above-noted circumstances and an object thereof is to provide an image stabilizing device in a camera which is provided with image stabilizing means for preventing the image blur of the camera, lock means for locking said image stabilizing means in a predetermined state, and control means responsive to the operation of a shutter release member to operate or release said lock means and which eliminates the necessity of performing a cumbersome operation for operating or releasing said lock means and which can prevent the inconvenience that the photographer forgets said locking and causes said image stabilizing means to be damaged.

Other objects of the present invention will become apparent from the following detailed description of some embodiments of the invention.

BRIEF DESCRIPTION OF THE DRAWINGS

FIGS. 4A and 4B are flow charts showing the operation of the sequence control circuit 6 of FIG. 1.

FIGS. 5A and 5B are flow charts showing another example of the operation of the sequence control circuit 6 of FIG. 1 as another embodiment of the present invention.

DESCRIPTION OF THE PREFERRED EMBODIMENTS

Some embodiments of the present invention will hereinafter be described with reference to the drawings.

Figure 1:
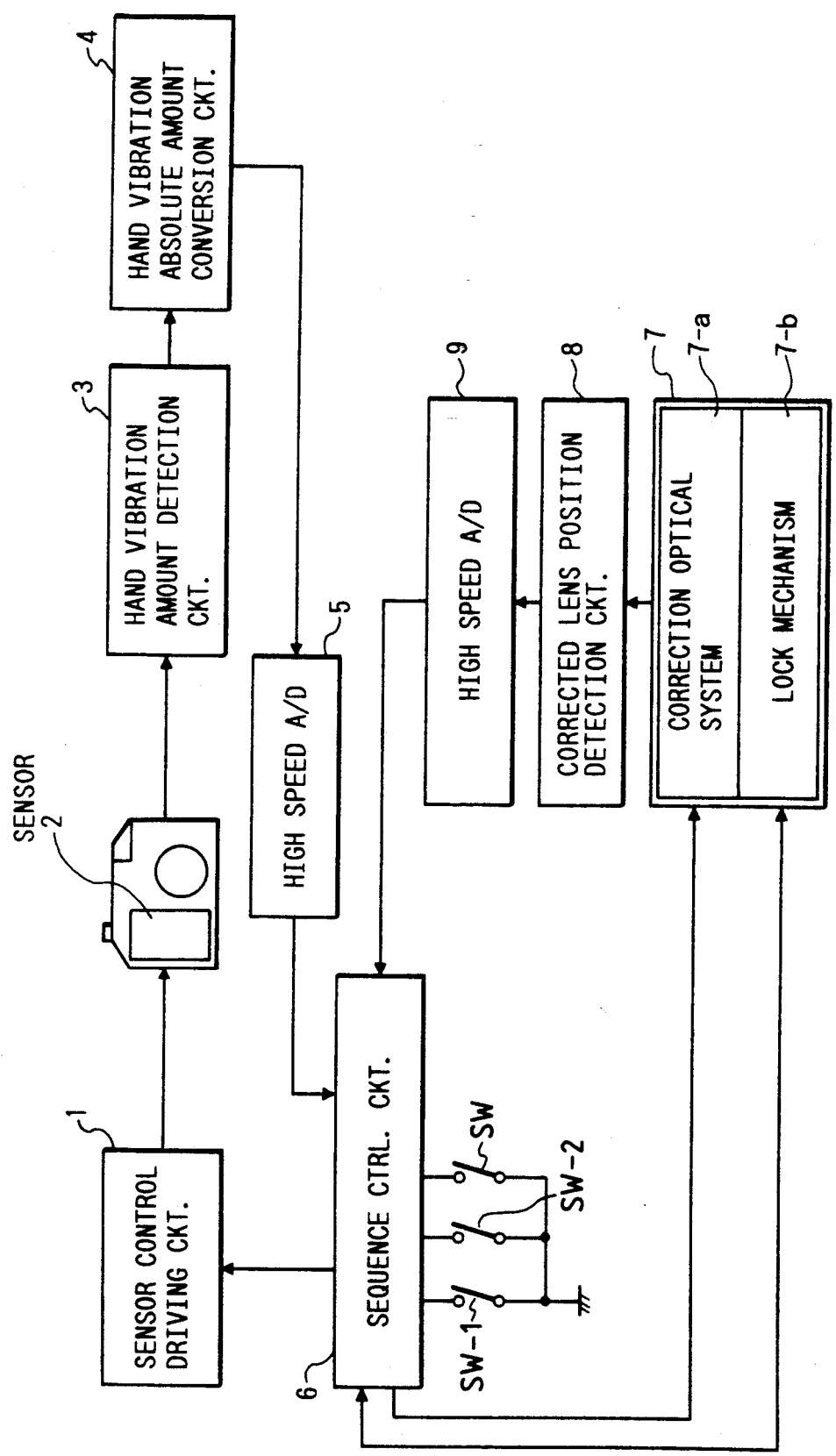
FIG. 1 is a block diagram of an image stabilizing device in a camera according to an embodiment of the present invention.

Referring to FIG. 1 which is a block diagram of an image stabilizing device in a camera according to an embodiment of the present invention, the reference numeral 1 designates a sensor control driving circuit for controlling and driving a sensor 2 which outputs the vibration information of the camera, the reference numeral 2 denotes a camera vibration detecting sensor incorporated in the camera, and the reference numeral 3 designates a hand vibration amount detection circuit for detecting the amount of hand vibration from the output of the sensor 2. The reference numeral 4 denotes a hand vibration absolute amount conversion circuit for converting the amount of hand vibration from the hand vibration amount detection circuit 3 into absolute displacement, the reference numeral 5 designates a high speed A/D conversion circuit for converting the analog amount converted into absolute displacement by the circuit 4 into a digital value, and the reference numeral 6 denotes a sequence control circuit comprised of a microcomputer or the like for effecting the control of the photographing preparation operation, the photographing operation and the vibration detecting operation of the camera, the control of the driving of a correction optical system and the control of a lock mechanism. The reference numeral 7 designates an image blur correcting device operated in conformity with the detected amount of vibration, and the reference character 7-a denotes a correction optical system for correcting vibration by moving a correction lens, and stabilizing the image on the image plane. The correction optical system 7-a has an engaged portion engaged with a member supporting the correction lens. The reference character 7-b designates a lock mechanism having an engaging portion for locking the correction lens at a certain position, and effecting the locking by engagement on said engaged portion and the release of the engagement. The reference numeral 8 denotes a correction lens position detection circuit for detecting the position of said correction lens, and the reference numeral 9 designates a high speed A/D conversion circuit for converting the position of the correction lens into a digital value.

The epitome of the operation in the above-described construction will now be described.

The sequence control circuit 6 is first started by the closing of a switch SW1 for starting the photographing preparation which is mounted outside the camera and operated by the photographer and operatively associated with the first stroke of a shutter release button. Thereupon, the sequence control circuit 6 transmits a signal to the sensor control driving circuit 1 and supplies electric power to the hand vibration amount detecting system and also drives the sensor 2, thereby starting the detection of the actual amount of vibration of the camera. As regards the signal output from the sensor 2, only the amount of hand vibration is detected by the hand vibration amount detection circuit 3, but the meaning of the output signal differs depending on the sensor 2, that is, for example, if the sensor 2 is an angular acceleration sensor, an angular acceleration output induced during the vibration of the camera is detected and put out, and if the sensor 2 is a sensor such as a vibration gyro, the angular velocity output of hand vibration is detected and put out, and if the sensor 2 is a sensor which lowers a pendulum in the direction of gravity and detects the hand vibration of the camera by the angle of deflection thereof, the angle output of the hand vibration is detected and put out. In order that this output may be converted into hand vibration displacement by the hand vibration absolute amount conversion circuit 4, this output is first-order-integrated or second-order-integrated in the circuit 4, whereafter it is converted into an absolute displacement output, and then is converted into a digital value by the high speed A/D conversion circuit 5 and is introduced as an amount of hand vibration (the amount of vibration of the camera) into the sequence control circuit 6.

In the sequence control circuit 6, a command signal for moving the correction lens is output from said amount of hard vibration so that in the correction optical system 7-a the image may be stabilized on the image plane. In the correction optical system 7-a closed loop servo driving is applied so that the correction lens may follow the command signal. Also, the position of the correction lens is detected by the correction lens position detection circuit 8, whereafter it is sent to the sequence control circuit 6 via the high speed A/D conversion circuit 9 and is used as other control information, for example, for the control of the display of the warning that the amount of hand vibration is great.

Figure 2:
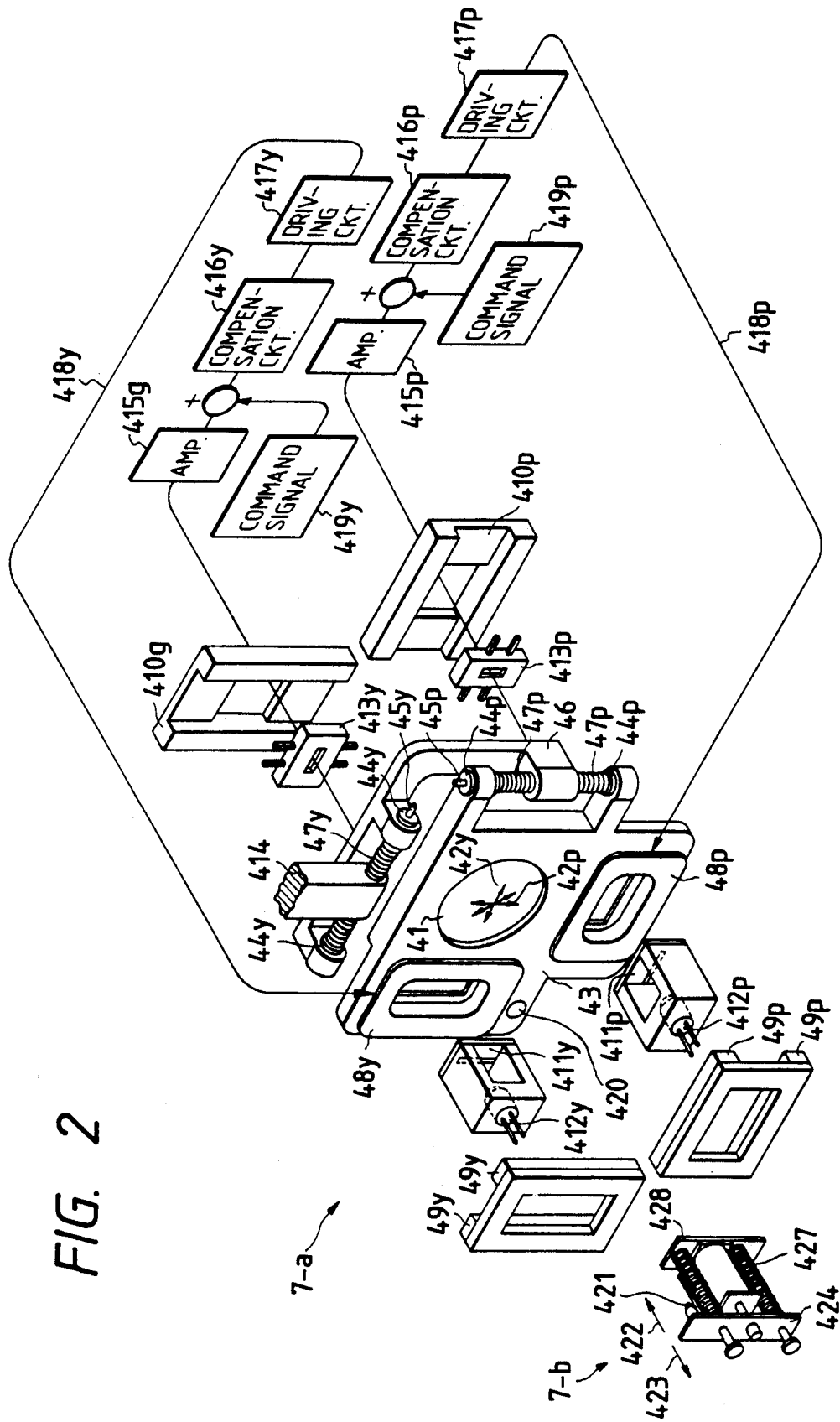
FIG. 2 shows the construction of the image stabilizing device shown in FIG. 1.

An actual example of the image blur correction device 7 (the correction optical system 7-a and the lock mechanism 7-b) is shown in FIG. 2.

The correction optical system 7-a is an optical system forming a part of a photo-taking lens system, and is a mechanism for moving the correction lens 41 in a direction to correct hand vibration in a plane orthogonal to the optical axis, thereby obtaining the image vibration correcting effect on the imaging plane.

The correction lens 41 can be freely driven in two directions (pitch 42p and yaw 42y) orthogonal to the optical axis and perpendicular to each other. The construction of the correction lens will hereinafter be described.

In FIG. 2, a fixed frame 43 for holding the correction lens 41 is designed to be slidable on a pitch slide shaft 45p through a plain bearing 44p of polyacetal resin (hereinafter referred to as POM) or the like. The pitch slide shaft 45p is mounted on a holding frame 46. The fixed frame 43 is nipped between pitch coil springs 47p coaxial with the pitch slide shaft 45p, and is held near the neutral position. A pitch coil 48p is mounted on the fixed frame 43.

The pitch coil 48p is disposed in a magnetic circuit comprised of a pitch magnet 49p and a pitch yoke 410p, and the fixed frame 43 is driven in a pitch direction 42p by an electric current being supplied to the magnetic circuit. The pitch coil 48p is provided with a slit 411p, and the detection of the position of the fixed frame 43 in the pitch direction 42p is effected by the relation between a light projector 412p (infrared light emitting diode IRED) and a light receiver 413p (semiconductor position detecting element PSD).

A plain bearing 44y of POM or the like is fitted to the holding frame 46 and can slide on a housing 414 on which a yaw slide shaft 45y is mounted. The housing 414 is mounted on a lens barrel (not shown) and therefore, the holding frame 46 is movable in the yaw direction 42y relative to the lens barrel. A yaw coil spring 47y is provided coaxially with the yaw slide shaft 45y, and is held near the neutral position, like the fixed frame 43.

Also, a yaw coil 48y is provided on the fixed frame 43, and the fixed frame 43 is driven also in the yaw direction 42y by the relation between a yaw magnet 49y and a yaw yoke 410y sandwiching the yaw coil therebetween. The yaw coil 48y is provided with a slit 411y, and the detection of the position of the fixed frame 43 in the yaw direction 42y as well as in the pitch direction is effected by a light projector 412y and a light receiver 413y.

In FIG. 2, when the outputs of the light receivers 413p and 413y are amplified by amplifiers 415p and 415y and are input to the pitch coil 48p and the yaw coil 48y through compensation circuits 416p, 416y and driving circuits 417p, 417y, the fixed frame 43 is driven and the outputs of the light receivers 413p and 413y vary. When here, the driving direction (polarity) of the coils is made into a direction in which the outputs of the light receivers 413p and 413y become small, there is formed a closed system indicated by solid lines 418p and 418y, and this system becomes stable at a point whereat the outputs of the light receivers 413p and 413y become substantially zero.

The compensation circuits 416p and 416y are circuits for stabilizing the system more, and the driving circuits 417p and 417y are circuits for making up for an electric current applied to the coils 48p and 48y.

When command signals 419p and 419y are given to such a system from the outside which corrects it in conformity with the amount of hand vibration from the sequence control circuit 6 of FIG. 1, the correction lens 41 is driven in the pitch direction 42p and the yaw direction 42y very faithfully to the command signals and there is obtained the image vibration correcting effect.

The lock mechanism 7-b will now be described.

The fixed frame 43 holding the correction lens 41 is provided with a conical concave portion 420 as an engaged portion, and a conical convex portion 421 which as an engaging portion is rectilinearly moved in the direction of arrow 422, whereby it is urged against the concave portion 420 which is an engaged portion, and is engaged with the latter in a state in which the center lines of the concave and convex cones coincide with each other. Thereby, the movement of the fixed frame 43 integral with the correction lens 41 in two directions (pitch 42p and pitch 42y) orthogonal to the optical axis and perpendicular to each other is restricted and the correction lens 41 becomes locked.

When the correction lens is to be unlocked, the conical convex portion 421 is moved in the direction of arrow 423 opposite to the direction of arrow 422 and becomes separate from the conical concave portion 420 which is an engaged portion, and the fixed frame 43 integral with the correction lens 41 is brought into its unlocked state in which it can be freely driven in a plane orthogonal to the optical axis.

The lock mechanism 7-b which effects the driving of the conical convex portion 421 which is an engaging portion in the directions of arrows 422 and 423 is fixed integrally to the housing 414 of FIG. 2 and is made into a unit with the correction optical system 7-a.

The details of the construction of the lock mechanism 7-b will now be described with reference to FIG. 3.

The conical convex portion 421 is mounted on a plate 424, has its movement restricted with a plate 425 by two shafts with the aid of an aperture fitting and is slidable in the direction of arrow 422 or the direction of arrow 423. The plate 424 is endowed with a spring property so as to absorb any shock during the engagement (locking) between the concave portion 420 and the convex portion 421 and to be urged against the concave portion. The locked state of the convex portion 421 and the plate 424 is indicated by solid lines, and the unlocked state thereof is indicated by broken lines.

A conventional plunger type latch solenoid 428 comprising a combination of a slider 428a on a cylinder rectilinearly movable in the directions of arrows 422 and 423, a permanent magnet and a solenoid coil are coupled to the plates 424 and 425 at the tip end of the slider 428a, and are biased by a coil spring 427 in the direction of arrow 423 which is a direction for releasing the engagement. In its locked state, the slider 428a is latched by the magnetic force of the permanent magnet of the plunger type latch solenoid 428.

In its locked state, the slider 428a is moved in the direction of arrow 423 which is an unlocking direction by the biasing force of the coil spring 427 working through the plate 425, by electrically energizing the solenoid coil of the latch solenoid 428 being so as to negate the magnetic force of the permanent magnet. When the plates 424 and 425 strike against a shaft 426, the slider becomes unlocked.

Also, by electrically energizing the solenoid coil of the latch solenoid 428 in the direction opposite to the unlocking direction, so as to increase the magnetic force of the permanent magnet, the slider 428a is subjected to a force in the direction of arrow 422 and overcomes the biasing force of the coil spring 427, and is moved so as to return the concave portion 420, which is in an engaged portion off the locked position as indicated by a dotted line to the locked position, thus being brought into its locked state.

Thus, the plunger type solenoid 428 can be electrically energized only during the changeover of the locked and unlocked states, and electrical energizing for maintaining the two states is not necessary.

Figure 4B:
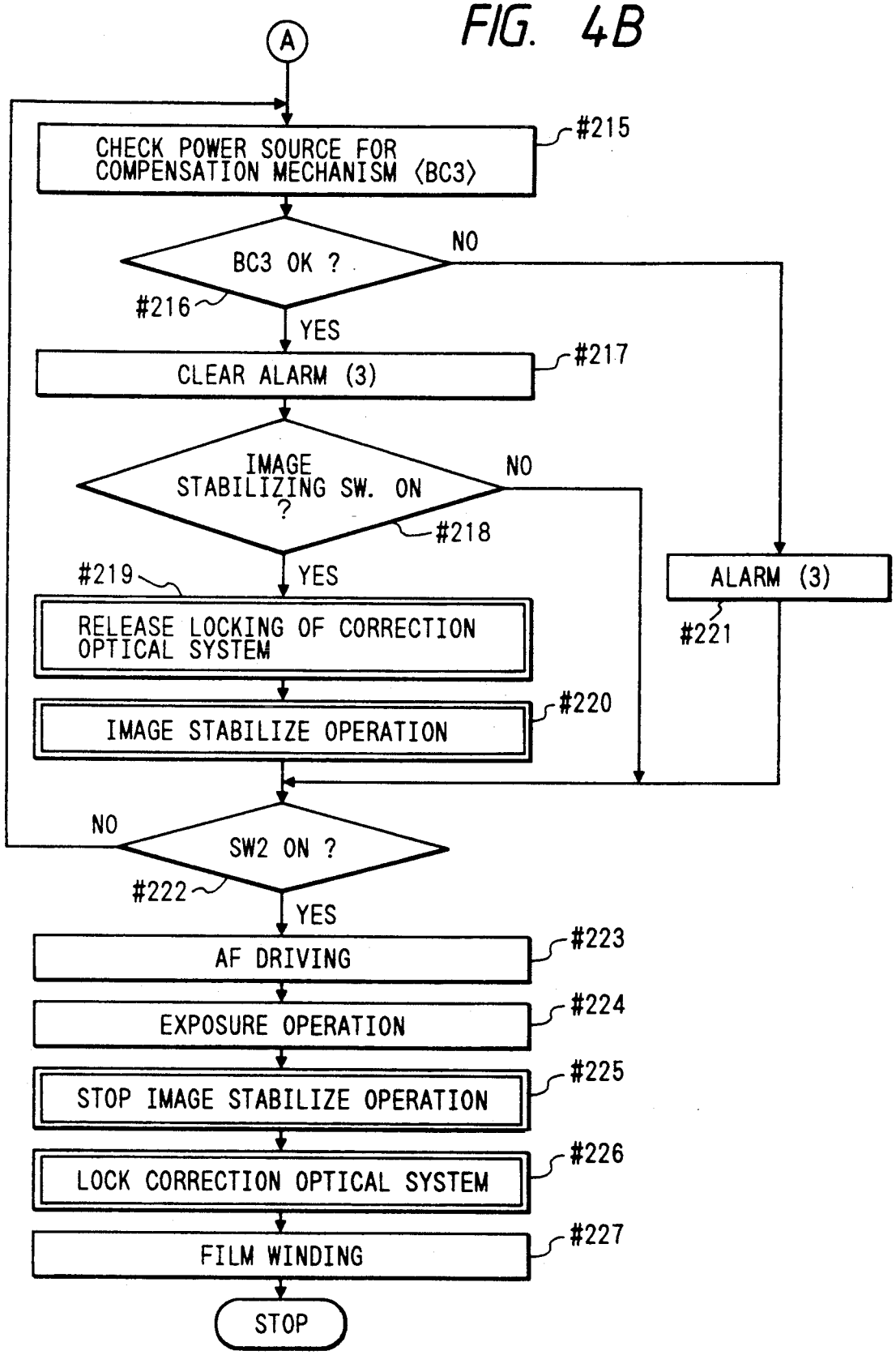

The general operation will now be described with reference to the flow chart of FIG. 4 which shows the operation of the sequence control circuit 6 of FIG. 1.

When the switch SW1 for indicating the photographing preparation is first closed in response to the first stroke of the shutter release button, the state judgement of a switch indicating the photographing preparation, such as a DX code T/W (tele/wide) switch, is done, and an LED for displaying various alarms is turned off, and BC (battery check) 1 for the photographing by the camera is effected, and then BC2 for ensuring the operation of the hand vibration detection system is effected (steps 201→202→203→204→205). If as a result, BC1 is NG (the operation ensuring voltage or lower) or BC2 also is NG, alarm (1) or alarm (2) is effected, and return is made to the original switch SW1 waiting operation (steps 206→207→201 or 208→209→201). On the other hand, if both of BC1 and BC2 are operational, the sequence control circuit 6 sends a signal to photometry and distance measuring circuits, not shown, thereby instructing these circuits to effect the distance measuring and photometry operations (steps 206→208→210→211). The results of the photometry and distance measurement are calculated previously on the data switch-input (at the step 202), and if a flash device is being used and the flash device is not charged, the flash device is charged (steps 213→214), and if the flash device is not being used or the flash device is charged, BC3 for the operation of the correction optical system 7-a is effected (steps 213→215), and if BC3 is NG, alarm (3) is effected (steps 216→221), and if BC3 is operational, alarm (3) is cleared (steps 216→217).

Then, the state of a switch SW for indicating whether the image stabilizing device outside the camera should be operated is judged, and if this switch SW is ON, the lock mechanism 7-b in the image stabilizing device is unlocked in the manner previously described (steps 218→219). That is, the plunger type latch solenoid of FIG. 3 which is in the lock mechanism 7-b is electrically energized for a predetermined time to effect unlocking. The correction lens is then operated so that the image stabilizing effect may be obtained by the correction optical system 7-a (step 220). Also, if the switch for indicating whether the image stabilizing device should be operated is OFF, neither the unlocking of the lock mechanism 7-b nor the image stabilizing operation is effected.

When a switch SW2 for indicating the start of the photographing operation is closed in response to the second stroke of the shutter release button, the AF (auto focus) driving of the lens is effected and a series of exposure operations for opening and closing the shutter are performed (steps 222→223→224). After the completion of this photographing operation, the image stabilizing operation by the correction optical system 7-a is stopped, whereafter the lock mechanism 7-b is operated and the plunger type latch solenoid of FIG. 3 is electrically energized for a predetermined time to effect locking, thereby locking the position of the correction lens (steps 225→226). Thereafter, film winding is effected (step 227).

Thus, a series of operations are terminated.

This embodiment is of a construction in which the camera body has a photo-taking lens therein. In a construction like a single-lens reflex camera, however, where the camera is comprised of a camera body and an interchangeable photo-taking lens, the image stabilizing device is provided on the photo-taking lens side, and the signals of the switches SW1 and SW2 may be transmitted, in a mount portion for connecting the interchangeable lens, from the camera body to the photo-taking lens side and in response thereto, the locking and unlocking of the internal lock mechanism may be effected. According to this embodiment, 1) In response to the ON signals of the switches SW1 and SW2 which have responded to the operation of the release button for performing the photographing preparation operation and the photographing operation, the locking and unlocking of the correction lens in the correction optical system 7-a is made possible by the compact lock mechanism 7-b;

2) The locking and unlocking of the correction lens in the correction optical system 7-a can be accomplished simply by the plunger type latch solenoid of the lock mechanism 7-b being electrically energized only during the changeover of the locking and unlocking, and the electrical energizing of the lock mechanism 7-b for maintaining the locked and unlocked states is not necessary and thus, the saving of electric power is made possible; and 3) Since the image stabilizing device has therein the correction optical system 7-a and the lock mechanism 7-b, the system 7-a and the mechanism 7-b can be made into a unit, and the present invention can also be applied to such a photo-taking lens so that the image stabilizing device is moved on the optical axis by zooming.

Another embodiment of the present invention will now be described with reference to FIG. 5.

This embodiment differs in the following point from the above-described embodiment. In unlocking and locking the lock mechanism 7-b operatively associated with the ON signals of the switches SW1 and SW2, the states of which change in response to the operation of the release button, the concave portion 420 which is an engaged portion provided on the correction optical system 7-a side is driven to the position of the locked state in two sections, i.e., the section "from unlocking until the start of the image stabilizing operation" and the section "from immediately before locking until locking". That is, in the previous embodiment, the position of the concave portion 420 on the correction optical system 7-a (in a plane orthogonal to the optical axis) usually lies at a position differing from that in the locked state between the two sections after unlocking and immediately before locking and consequently, when the position of the concave portion 420 deviates extremely from the position of the convex portion 421 on the lock mechanism 7-b side, there is the possibility of locking (the engagement between the concave portion and the convex portion) being not properly accomplished, and the present embodiment intends to solve this problem.

The operation for realizing this will hereinafter be described with reference to the flow chart of FIG. 5 which shows another example of the operation of the sequence control circuit of FIG. 1.

Steps 201 to 218 are similar to the previous embodiment (FIG. 4) and therfore need not be described.

When the switch is on for indicating whether the image stabilizing device outside the camera should be operated, the position of the concave portion 420 which is the engaged portion of the correction optical system 7-a is electrically held in its locked state (step 219A). The correction lens 41, the fixed frame 43 holding it and the concave portion 420 integral thereto can be driven by the correction optical system 7-a of FIG. 2 faithfully to command signals 419p and 419y given from the sequence control circuit 6 of FIG. 1. As a result, the position of the locked state is memorized in advance as a command signal in the sequence control circuit 6, and the predetermined command signals 419p and 419y are given to the correction optical system 7-a until the image stabilizing operation is performed, whereby the above-described operation becomes possible.

Substantially simultaneously with the electrical holding of the locking of the concave portion 420, the locking of the correction optical system 7-a by the lock mechanism 7-b is released (step 219B). Thereafter, the image stabilizing operation is performed (step 220), and when the switch SW2 adapted to be closed by the second stroke of the release button is closed, AF driving and the exposure operation are performed (steps 222→223→224). The image stabilizing operation is then stopped, and the position of the concave portion 420 of the correction optical system 7-a is again electrically driven to the locked position by the aforedescribed method (steps 225→226A). The lock mechanism 7-b is then driven to thereby lock the position of the correction lens (step 226). Thereafter, film winding is effected (step 227).

According to the present embodiment, when the correction lens of the correction optical system 7-a is to be locked and unlocked in response to the ON signals of the switches SW1 and SW2 the states of which change in response to the operation of the release button, the position of the concave portion 420 of the correction optical system 7-a is brought to the same position as the locked position, whereby the following effects are achieved. This will hereinafter be described with reference to FIG. 6.

Figure 6:
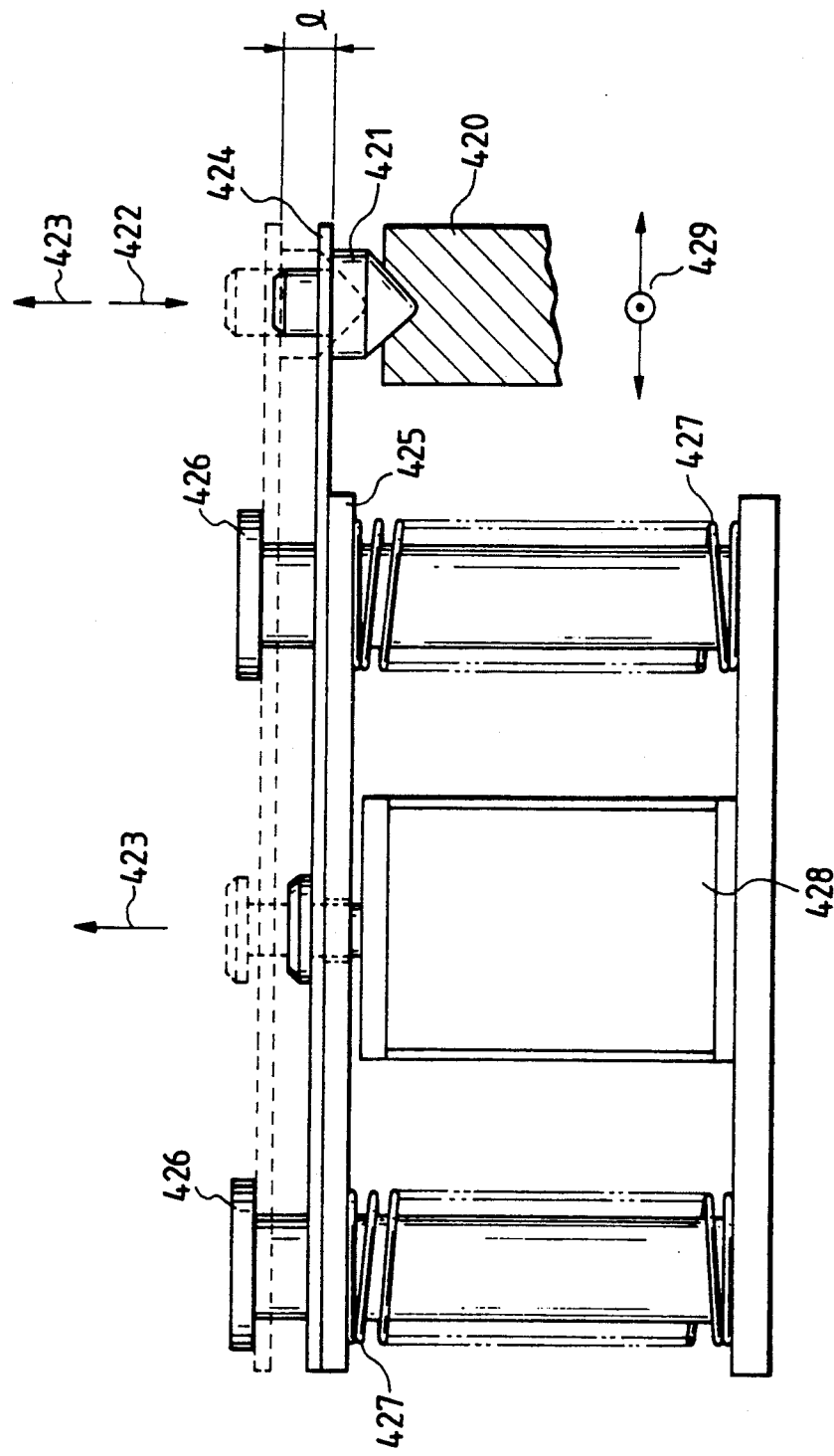
FIG. 6 is a side view for illustrating the operative state of the lock mechanism.
Figure 7:
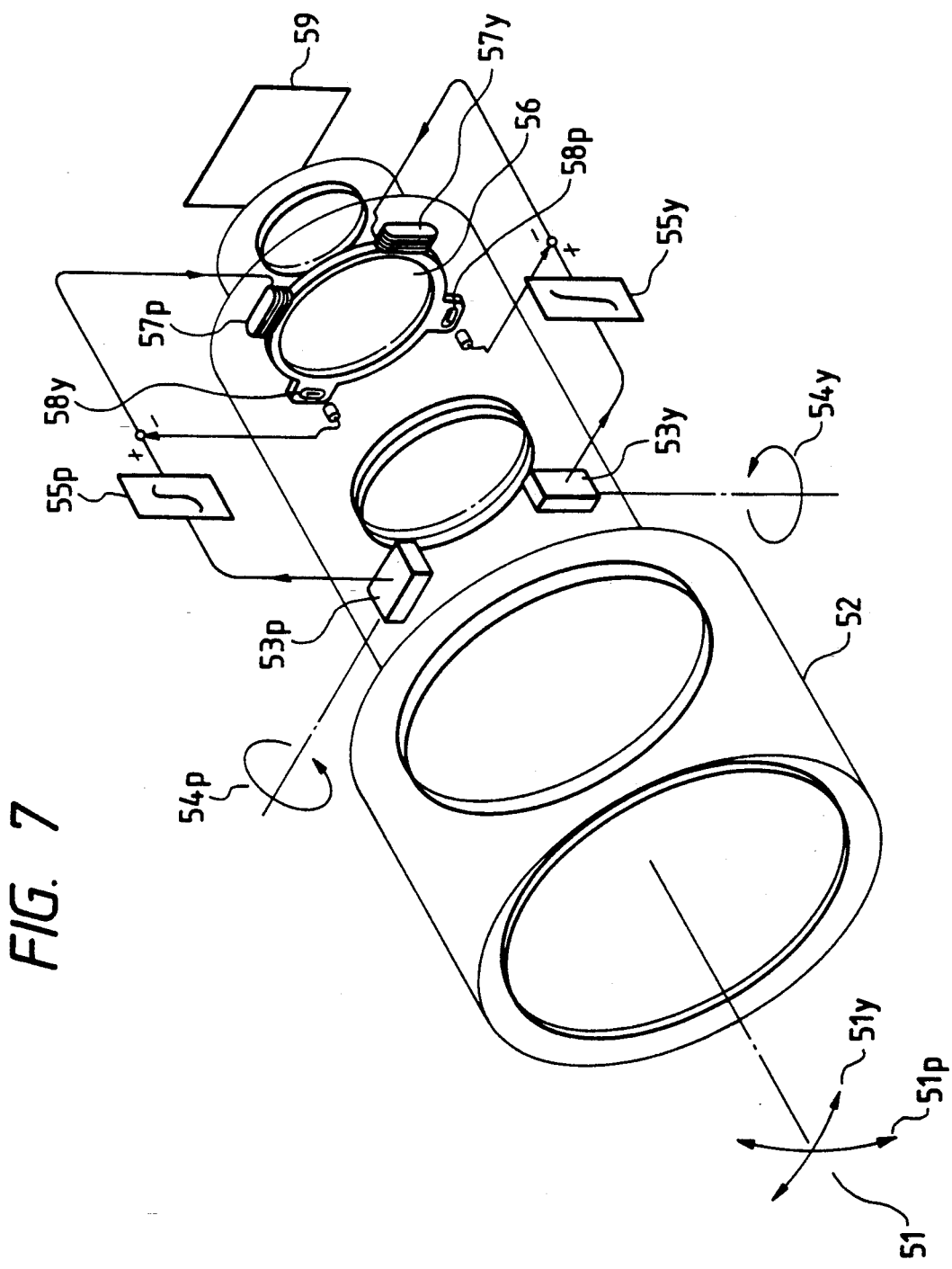
FIG. 7 is a perspective view schematically showing the construction of a popular camera endowed with the image vibration correcting function.

In FIG. 6, the locked state is indicated by solid lines and the unlocked state is indicated by broken lines.

1) In locking and unlocking, the correction lens is not subjected to any extraneous force in the other directions than the directions of arrows 422 or 423 which are the operating directions relative to the convex portion 421. Therefore, the operation becomes stable.

2) In locking and unlocking, the conical convex portion 421 which is an engaging portion and the conical concave portion 420 which is an engaged portion can be made small in shape. Moreover, the strokes of the locked state and unlocked state can also be made small and thus, the lock mechanism 7-b can be made compact.

Figure 3:
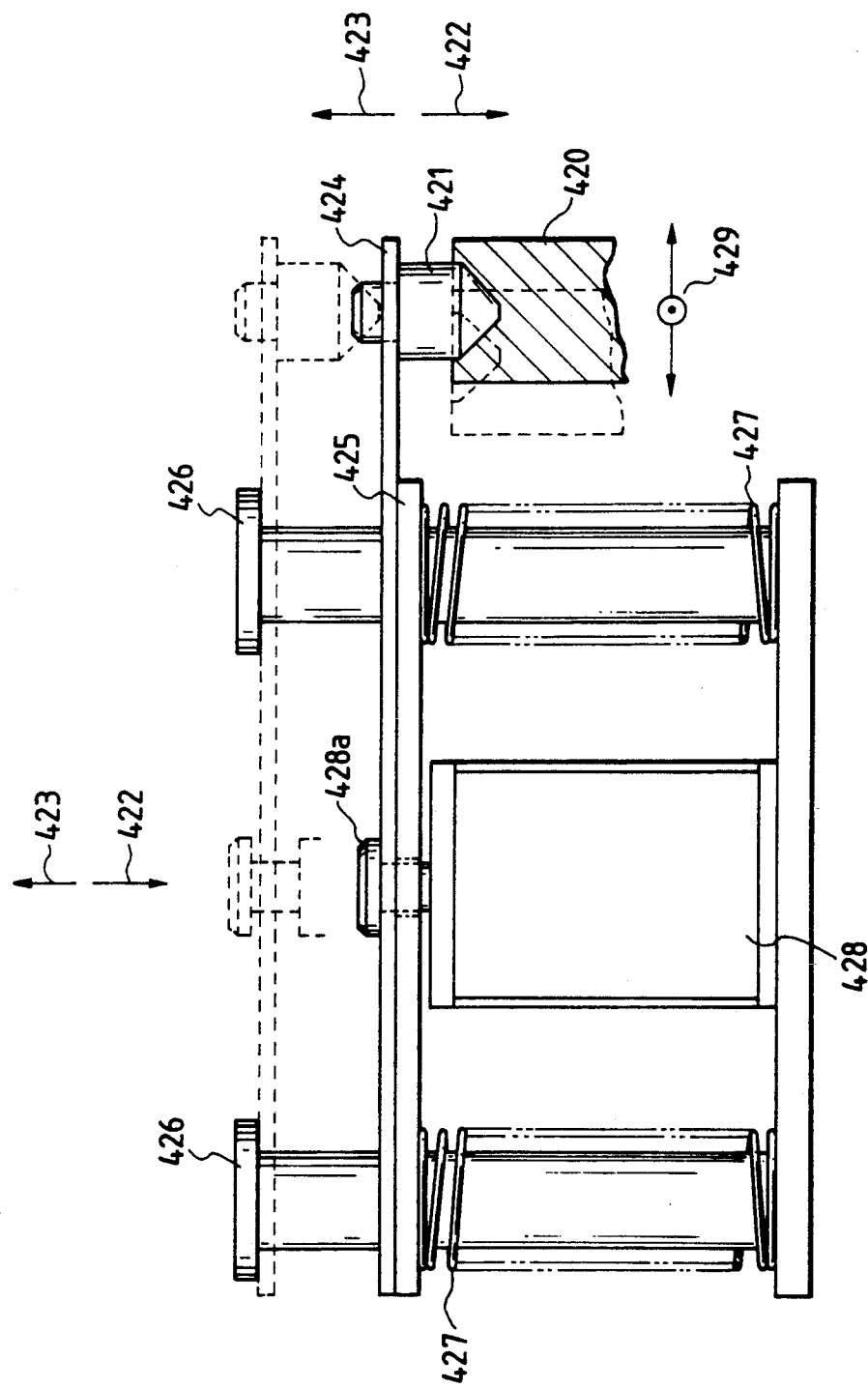
FIG. 3 is a side view for illustrating the operative state of the lock mechanism shown in FIG. 2.

3) When during locking, as indicated by a dotted line in FIG. 3, the position of the concave portion 420 is far from the position of the locked state, the plunger type latch solenoid 428 must overcome the biasing force of the coil spring 427 and impart to the slider 428a a force for bringing the concave portion 420 into the position of the locked state but by adopting the construction of this embodiment, the latter force need not be imparted and the output of the plunger type latch solenoid 428 can be made small, and the amount of electric power supplied to the solenoid can be made small or the plunger type latch solenoid 428 itself can be made small, that is, the lock mechanism 7-b can be made compact.

Also, the following is possible as a modification of the present embodiment.

In the unlocking and locking by the lock mechanism 7-b operatively associated with the ON signals of the switches SW1 and SW2, the states of which change in response to the operation of the release button, the optical axis of the photo-taking lens and the optical axis of the correction lens 41 of the correction optical system 7-a are made coincident with each other in the locked state.

That is, the positions of the concave portion 420 and convex portion 421 in FIG. 2 are preset so that the optical axis of the photo-taking lens and the optical axis of the correction lens 41 may coincide with each other in the locked state, whereby the image stabilizing operation begins without fail from a state in which the optical axis of the correction lens 41 and the optical axis of the photo-taking lens coincide with each other.

The image stabilization range in the image stabilizing operation is the parallel movement range of the optical axis of the correction lens within which image stabilization is obtained. This symmetrical with respect to the optical axis of the photo-taking lens and the image stabilization range exists about the optical axis of the photo-taking lens.

The effect of doing this is that the image stabilizing operation begins without fail from the center of the image stabilization range, i.e., the optical axis of the photo-taking lens, and the most advantageous image stabilizing operation can be performed for the amount of vibration of the camera.

According to each of the above-described embodiments, the two operations of "locking" the correction optical system and "unlocking" the correction optical system are performed by driving the lock mechanism 7-b in operative association with the ON signals of the switch SW1 (the switch for starting the photographing preparation operation) and switch SW2 (the switch for starting the photographing operation) which respond to the first stroke and the second stroke, respectively, of the release button and therefore, the photographer can perform said "locking" and "unlocking" in a series of photographing operations without performing any other operation. Thus, the photographer not only need not perform any cumbersome operation, but also the "locking" operation is performed without fail by the photographing operation being terminated. Therefore, there is no possibility of the correction optical system being oscillated and damaged as when the camera is carried.

The lock mechanism in the above-described embodiments is of a construction in which the convex portion 421 which is an engaging portion is brought into engagement with the concave portion 420 which is an engaged portion provided in the fixed frame 43 holding the correction lens 41, thereby accomplishing locking. In contrast, the lock mechanism is not restricted to such a construction, but may be of a construction in which in operative association with the ON signals of the switches SW1 and SW2, for example, the fixed frame 43 is embraced from before and behind it (in the direction of the photographing optical axis) to thereby lock the correction lens 41.

The operative association between the lock mechanism and the shutter release operation is not limited to that in the above-described embodiments, but of course, the present invention can be applied to any operation regarding the shutter release operation and controlling the lock mechanism, such as the other stroke position of the shutter release button and, further, the self-timer photographing operation and the remote control release operation.

Of course, the present invention also covers the operative association of only one of the action and unlocking of the lock mechanism with the shutter release operation.

Further, the present invention can of course be applied to any vibration detection means or any vibration correction means.

What is claimed is:

1. An image stabilizing device in a camera including:
   (A) image stabilizing means for preventing the image blur of the camera;
   (B) lock means for locking said image stabilizing means in a predetermined state; and
   (C) control means responsive to the operation of a shutter release member to operate or release said lock means.

2. An image stabilizing device according to claim 1, wherein said image stabilizing means includes an optical system displaceable to prevent the image vibration.

3. An image stabilizing device according to claim 2, wherein said lock means includes means for locking said optical system in a predetermined position.

4. An image stabilizing device according to claim 3, wherein said lock means includes means for mechanically locking said optical system.

5. An image stabilizing device according to claim 1, wherein said lock means includes means for mechanically locking said image stabilizing means.

6. An image stabilizing device according to claim 5, wherein said control means includes means for electrically effecting the control of said lock means.

7. An image stabilizing device according to claim 5, wherein said control means includes means for electrically starting the operation or release of said lock means.

8. An image stabilizing device according to claim 1, wherein said control means includes means responsive to the photographing preparation operation of said shutter release member to release said lock means.

9. An image stabilizing device according to claim 1, wherein said control means includes means responsive to the first stroke of the depression of said shutter release member to release said lock means.

10. An image stabilizing device according to claim 1, wherein said control means includes means responsive to the photographing starting operation of said shutter release member to operate said lock means.

11. An image stabilizing device according to claim 1, wherein said control means includes means responsive to the second stroke of the depression of said shutter release member to operate said lock means.

12. An image stabilizing device according to claim 3, wherein said control means includes biasing means for biasing said optical system to said predetermined position before said lock means is operated or released.

13. An image stabilizing device according to claim 12, wherein said biasing means includes means for electrically acting.

14. An image stabilizing device according to claim 12, wherein said predetermined position includes the substantial movable center of said optical system.

15. An image stabilizing device according to claim 3, wherein said predetermined position includes the substantial movable center of said optical system.

16. A camera provided with an image stabilizing device, including:
    (A) image stabilizing means for preventing the image blur of the camera;
    (B) lock means for locking said image stabilizing means in a predetermined state; and
    (C) control means responsive to the operation of a shutter release member to operate or release said lock means.

17. A camera according to claim 16, wherein said image stabilizing means includes an optical system displaceable to prevent the image vibration.

18. A camera according to claim 17, wherein said lock means includes means for locking said optical system in a predetermined position.

19. A camera according to claim 18, wherein said lock means includes means for mechanically looking said optical system.

20. A camera according to claim 16, wherein said lock means includes means for mechanically locking said image stabilizing means.

21. A camera according to claim 20, wherein said control means includes means for electrically effecting the control of said lock means.

22. A camera according to claim 20, wherein said control means includes means for electrically starting the operation or release of said lock means.

23. A camera according to claim 16, wherein said control means includes means responsive to the photographing preparation operation of said shutter release member to release said lock means.

24. A camera according to claim 16, wherein said control means includes means responsive to the first stroke of the depression of said shutter release member to release said lock means.

25. A camera according to claim 16, wherein said control means includes means responsive to the photographing starting operation of said shutter release member to operate said lock means.

26. A camera according to claim 16, wherein said control means includes means responsive to the second stroke of the depression of said shutter release member to operate said lock means.

27. A camera according to claim 18, wherein said control means includes biasing means for biasing said optical system to said predetermined position before said lock means is operated or released.

28. A camera according to claim 27, wherein said biasing means includes means for electrically acting.

29. A camera according to claim 27, wherein said predetermined position includes the substantial movable center of said optical system.

30. A camera according to claim 18, wherein said predetermined position includes the substantial movable center of said optical system.

* * * * *

UNITED STATES PATENT AND TRADEMARK OFFICE
CERTIFICATE OF CORRECTION

PATENT NO. : 5,153,633
DATED : October 6, 1992
INVENTOR(S) : Tadasu Otani It is certified that error appears in the above-identified patent and that said Letters Patent is hereby corrected as shown below:

Col. 1, line 20.   Change "haven" to -- have --
Col. 4, line 51,   After "7-a" insert -- , --
Col. 6, line 52.   Delete -- , --
Col. 6, line 53.   Delete -- being --
Col. 10, line 35.  Change "button and therefore," to
                    -- button. Therefore, --
Col. 12, line 20.  Change "looking" to -- locking --

Signed and Sealed this

Ninth Day of November, 1993

*Attest:*

BRUCE LEHMAN

*Attesting Officer*   *Commissioner of Patents and Trademarks*